Feb. 2, 1954 — M. WEIDNER — 2,667,976
PAINT STRAINER
Filed Jan. 16, 1948
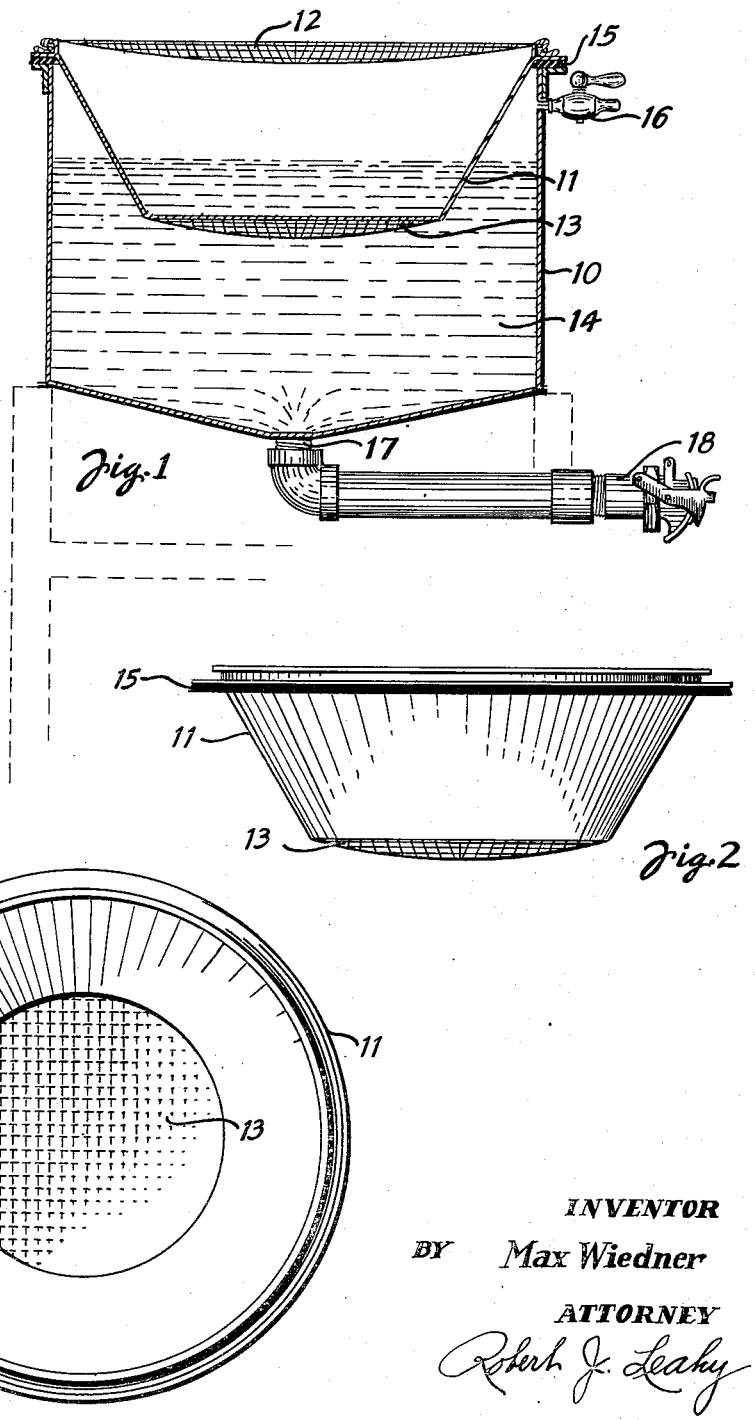
INVENTOR
BY Max Wiedner
ATTORNEY
Robert J. Leahy Patented Feb. 2, 1954

2,667,976

UNITED STATES PATENT OFFICE 2,667,976

PAINT STRAINER

Max Weidner, Racine, Wis., assignor to S. C. Johnson & Son, Inc., Racine, Wis.

Application January 16, 1948, Serial No. 2,599

1 Claim. (Cl. 210—156)

This invention relates to improvements in strainers. More particularly, the invention relates to an improved method for straining paint and to novel apparatus for carrying out this method.

In the manufacture of paint after the pigments and vehicles have been mixed and tinted and properly thinned, the paint is usually transferred from, for example, a 1000 gallon storage tank to a smaller vessel for straining and filling into containers. In the past such straining has entailed various methods and apparatus. The product may be passed through screens or riddles of a variety of forms and designs. In other cases loose fibrous material is placed over the screen or riddle, or the screen is vibrated to aid the movement of the liquid through the filtering material. In still other cases paint or enamel is passed through a centrifuge to strain out coarse material.

While all these methods are well known in the art for carrying out the straining operation, they are subject to the disadvantages of limited production due to the length of time necessary to accomplish the straining operation. Many such methods also entail considerable cost in manufacture and installation.

I have thus provided an improved method for straining paint which comprises passing a charge of unstrained paint through a straining area into a receptacle to a predetermined level, the level being above the point at which the strained paint enters the receptacle, and then introducing additional paint into the straining vessel. The strained paint is then removed from said receptacle at a rate so that the level of paint remaining in the receptacle is maintained above the point at which the strained paint enters the receptacle.

It is therefore a primary object of my invention to provide an improved method and apparatus for straining paint which will operate efficiently, requiring a minimum of time to accomplish the intended result and can be operated with a minimum of expense and labor.

Another object of my invention is to provide an improved method and apparatus for straining paint which can be manufactured and installed economically.

Other objects and advantages of the invention will be more apparent from the following description taken with the accompanying drawing in which:

Figure 1 is a front elevational view of the paint strainer mainly in section.

Figure 2 is a side elevational view of the straining vessel.

Figure 3 is a top plan view of the straining vessel.

Similar numerals refer to similar parts throughout the several views.

The paint strainer, generally designated by the numeral 10, includes a straining vessel 11 having a greater circumference at its top than at its bottom. At the top of the straining vessel 11 is affixed a cheesecloth screen or other similar porous filter element 12. The bottom area of the vessel 11 consists essentially of a foraminous plate or wire screen 13. The straining vessel 11 is securely but detachably positioned within an open receptacle 14 and is held or rendered impervious to air by means of a gasket 15. An air release vent 16 is positioned on the receptacle 14 somewhere intermediate the top and the wire screen 13. Preferably, however, it is positioned near the top of receptacle 14 as shown in Figure 1.

At the lowest point of the funnel-bottomed receptacle 14 a paint discharge outlet 17 is positioned, and attached thereto is a molasses gate valve 18 for controlled withdrawal of the paint from the receptacle 14. It will be readily understood that the discharge outlet 17, if desired, may be positioned on the side of receptacle 14 if preferred.

In operation, unstrained paint is filtered through the filter cloth 12 and wire screen 13, thereby eliminating undesirable material, such as skins and dirt, until the paint arrives at a level above the wire screen 13. The air release vent 16 is then opened allowing air entrapped in the area between the top of the receptacle 14 and the paint level to escape. Therefore, upon disengagement of the molasses gate valve 18 and withdrawal of the strained paint, a vacuum is created which quickens the egress of the paint from the receptacle 14. The process can be made continuous by regulating the amount of paint being continuously introduced to the filter 12 and the amount of strained paint being withdrawn.

The effectiveness of the operation can best be illustrated by the following examples:

*Example I*

A 1000 gallon storage tank is filled with unstrained paint. A charge of unstrained paint from the storage tank was filtered through the paint-straining apparatus hereinbefore described and shown in the drawing, except that the straining vessel 11 was not attached to the receptacle 14 by means of a gasket 15 in order to render the junction of the vessel 11 and receptacle 14 airtight. As soon as a charge of paint was flowed upon the filter cloth 12 the molasses gate valve 18 was opened and the strained paint flowed into a 55 gallon drum. The rate of flow of the unstrained paint upon filter cloth 12 was at the maximum rate that the filter cloth could handle. The molasses gate valve 18 was open to its maximum capacity and the rate of flow from the receptacle 14 into the drum was such that it took about 25 minutes to fill the drum to capacity.

*Example II*

The above example was repeated except that the paint strainer used was that described in detail in the specification and shown in the accompanying drawing. A charge of unstrained paint was flowed upon the filter cloth 12 and the air vent 16 and molasses gate valve 18 remained closed until the level of strained paint in the receptacle 14 was above the wire screen 13. The air vent 16 was then opened to discharge the entrapped air present in the receptacle 14. After the entrapped air was vented, the air vent 16 was closed. The molasses gate valve 18 was then opened and the charge of unstrained paint flowed upon the filter 12 was continued at a rate constant with the amount of strained paint being withdrawn through the molasses gate valve 18. The rate of withdrawal of the strained paint by the effect of the vacuum hereby created was such that a 55 gallon drum was filled in 2½ minutes or in 1/10 the time needed in Example 1.

To illustrate that this invention does not reside solely in the positioning of the strainer 11 into the receptacle 14 in such manner as to render it impervious to air the following example was carried out:

*Example III*

Example 2 was repeated except that the level of the strained paint in the receptacle 14 was intentionally maintained at a point lower than its point of introduction of paint into the receptacle 14 through the wire screen 13. It was found that the rate of flow through the molasses gate 18 was not substantially greater than the rate of flow in Example 1.

It will be readily understood that Examples 1, 2 and 3 were used for purpose of illustration only. The rate of flow of strained paint through the apparatus of this invention by the method hereinbefore described will depend somewhat upon the consistency of the paint to be strained and the size of the strainer. However, by the use of my method, I have found that paint can be strained in ⅕ to 1/10 the time previously needed for such straining.

While I have shown the preferred apparatus for carrying out my method it will be understood that other apparatuses may be used, providing that the point of introduction of the paint into the receptacle shall be below the level of the paint maintained in the receptacle and further providing that the strainer be positioned in the receptacle impervious to air with proper air vents being provided in the receptacle.

Thus, in accordance with my invention, I have provided an efficient paint strainer which may be manufactured and employed at a minimum of expense, nevertheless accomplishing an efficient straining operation in minimum time.

What is claimed is:

An improved method for straining paint, comprising passing a charge of unstrained paint through a straining vessel into a receptacle, having an air-tight juncture with said vessel, to a level within said receptacle above the point at which said paint enters the receptacle through said vessel, releasing the air entrapped above the strained paint between the inner periphery of said receptacle and the outer periphery of said straining vessel, immediately thereafter closing the means for said release of air and discharging the strained paint from said receptacle while introducing additional unstrained paint into said receptacle through said vessel at a rate sufficient to maintain the paint level in said receptacle above the level at which said paint entered said receptacle through said straining vessel.

MAX WEIDNER.

References Cited in the file of this patent

UNITED STATES PATENTS

| Number | Name | Date |
|---|---|---|
| 65,515 | Spencer | June 4, 1867 |
| 94,298 | Espent | Aug. 31, 1869 |
| 374,875 | Lyman | Dec. 13, 1887 |
| 453,798 | Gersdorff | June 9, 1891 |
| 473,081 | Rahn | Apr. 19, 1892 |
| 626,991 | Eberhard | June 13, 1899 |
| 1,020,986 | Jozsef | Mar. 26, 1912 |
| 1,115,505 | Chapin | Nov. 3, 1914 |
| 1,429,488 | Capro | Sept. 19, 1922 |
| 2,251,684 | Lomax | Aug. 5, 1941 |
| 2,449,238 | Lightfoot, Jr. | Sept. 14, 1948 |
| 2,450,510 | Hanson | Oct. 5, 1948 |

FOREIGN PATENTS

| Number | Country | Date |
|---|---|---|
| 1,367 | Great Britain | 1892 |
| 21,120 | Great Britain | 1904 |
| 4,929 | France | Sept. 11, 1905 |
| | First addition to 353,415 | |
| 509,931 | Germany | Oct. 14, 1930 |

OTHER REFERENCES

Filtration and Filters, by Pickard, published in 1929 by Ernest Benan Ltd., London, Bouveric House, E. C. 4. Page 37 cited.

Fischer Scientific Co., Modern Laboratory Appliances, page 625 cited, copyright 1934 by Fisher Scientific Co., 709 Forbes St., Pittsburgh, Pa.